M. ROCKSTROH.
FRICTION CLUTCH MECHANISM FOR PRINTING, STAMPING, AND DIE PRESSES AND THE LIKE.
APPLICATION FILED NOV. 14, 1906.

931,651.

Patented Aug. 17, 1909.
5 SHEETS—SHEET 3.

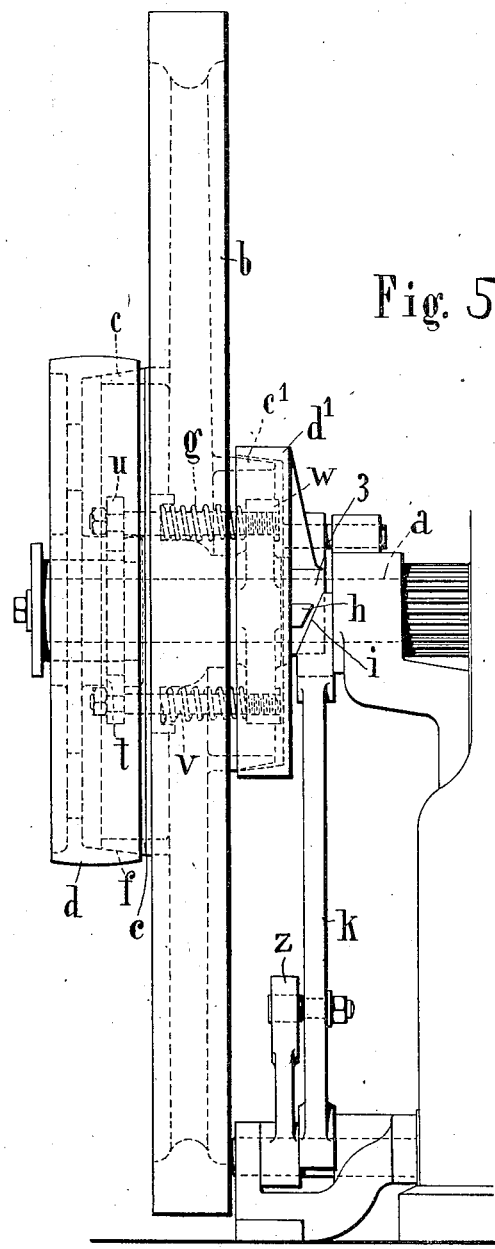

UNITED STATES PATENT OFFICE.

MAX ROCKSTROH, OF KLEIN-SEDLITZ, NEAR PIRNA, GERMANY.

FRICTION-CLUTCH MECHANISM FOR PRINTING, STAMPING, AND DIE PRESSES AND THE LIKE.

No. 931,651.     Specification of Letters Patent.    Patented Aug. 17, 1909.

Application filed November 14, 1906. Serial No. 343,429.

*To all whom it may concern:*

Be it known that I, MAX ROCKSTROH, director, citizen of the Kingdom of Saxony, residing at Klein-Sedlitz, near Pirna, Saxony, Germany, have invented certain new and useful Improvements in Friction-Clutch Mechanism for Printing, Stamping, and Die Presses and the Like, of which the following is a specification.

In the construction of printing, platen, stamping and die presses or other printing machinery actuated by friction clutches, it had heretofore been usual to mount the fly-wheel loosely upon the driving shaft, an arrangement that has the disadvantage that it is difficult to alter by hand the position of the machine when at rest. Moreover, a powerful brake is required, and the adjustment of such a brake when it has become worn by use, cannot easily be accomplished by an inexperienced printer. In apparatus to which this invention relates these defects are overcome by mounting the fly-wheel rigidly upon the shaft of the press and providing it with a hub which has the form of a friction cone and which in conjunction with a belt-pulley likewise constructed as a friction cone, effects the coupling; a brake which acts upon the fly-wheel being automatically put in operation when the uncoupling is effected.

The accompanying drawings illustrate two different forms of apparatus in accordance with this invention; wherein—

Figure 1:
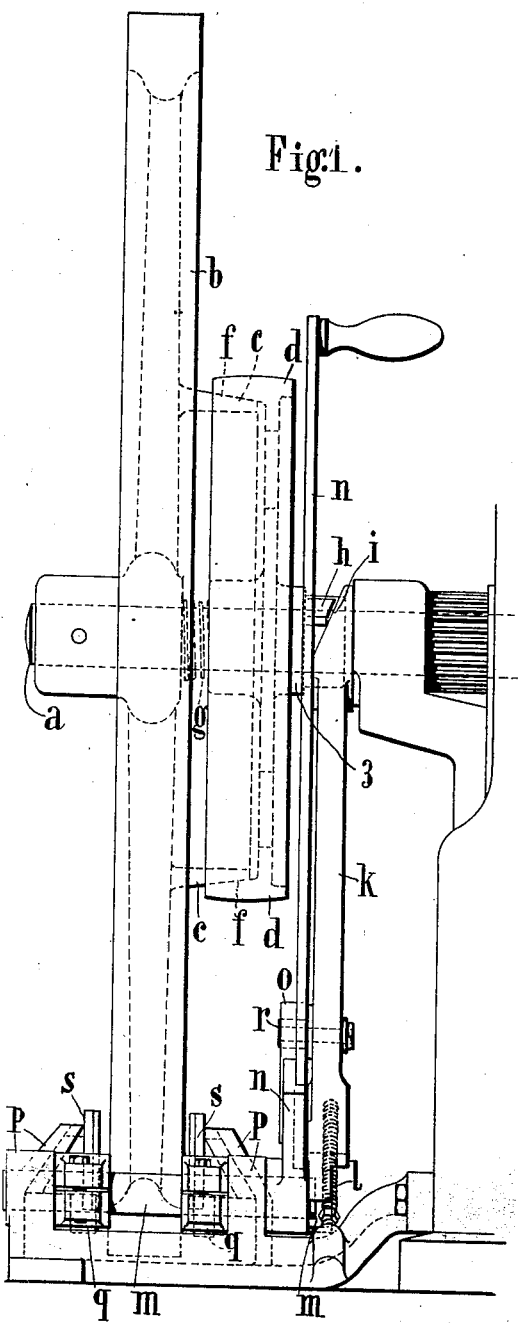
Figure 2:
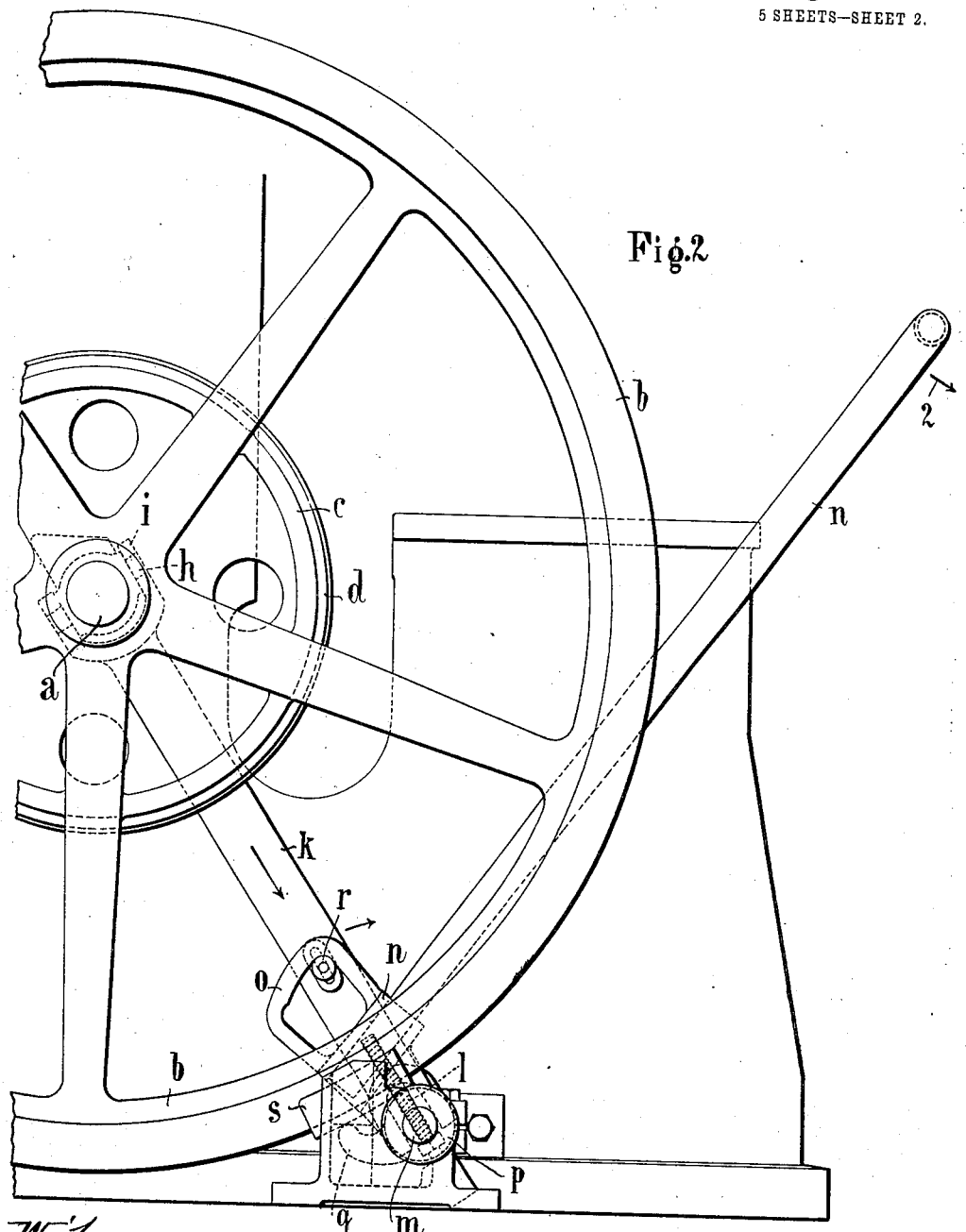
Figure 3:
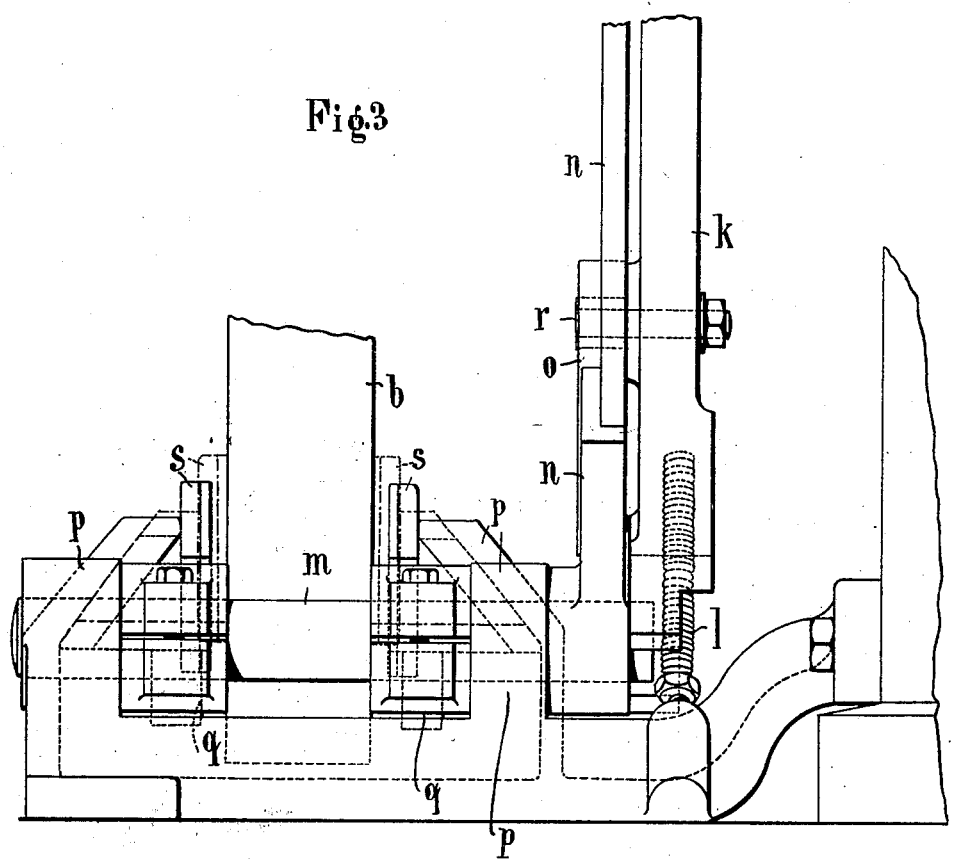
Figure 4:
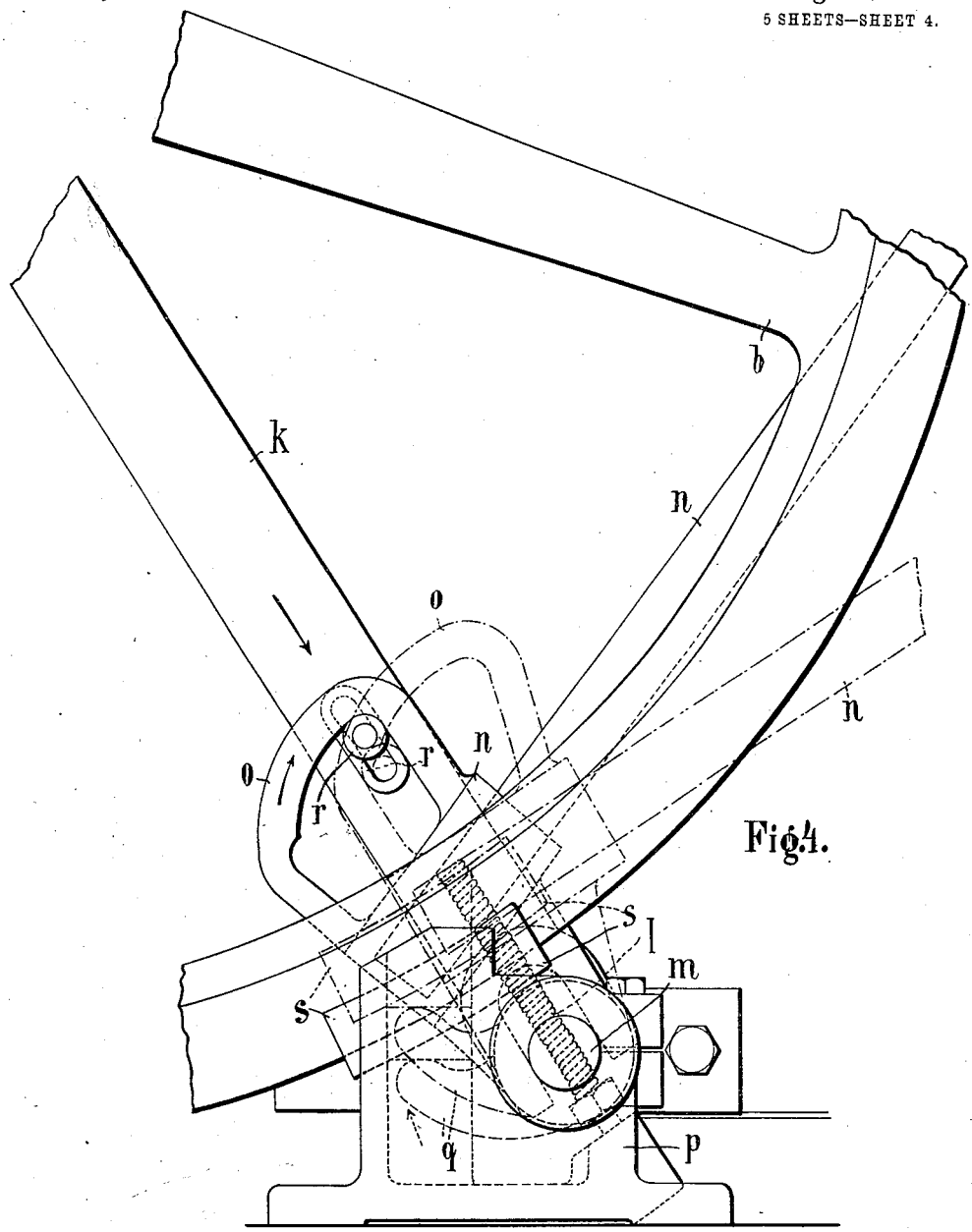

Figures 1 and 2 are respectively a front and a side elevation of one construction of apparatus; Fig. 3 is a representation of the brake mechanism on an enlarged scale; Fig. 4 is a side elevation of Fig. 3; Fig. 5 shows in side elevation a second form of construction.

In the form of the invention shown in Figs. 1 to 4 there is rigidly keyed to the main shaft $a$ the fly-wheel $b$, which is furnished on one side with a friction cone $c$; adjacent to the fly-wheel there is mounted to slide and rotate freely a belt pulley $d$ provided with an inner conical friction surface $f$. A spring $g$ which rests against the fly-wheel $b$ tends to separate the two friction cones $c$ and $d$. Upon the hub of the belt pulley $d$ there runs the sliding ring 3 which is furnished with tapered projections or tappets $h$ that are adjacent to the correspondingly oblique faces $i$ of the forked upper end of a rod $k$. The rod $k$ is pressed upward by means of a spring $l$ and thus effects the coupling. Through the lower end of this rod $k$ there passes the shaft $m$ which is mounted in bearings $p$ in the lower part of the frame of the machine and which can be rotated by means of the disengaging hand lever $n$ rigidly keyed thereon. The lower end of the lever $n$ is provided with a curved guide $o$ which projects over the roller $r$ of the connecting rod $k$ in such a manner that when, as shown in Fig. 4, the lever $n$ is turned down in the direction of the arrow 2 for the purpose of putting the machine out of operation the roller $r$ together with the connecting rod $k$ are depressed, with the result that the oblique faces $i$ release the correspondingly tapered tappets $h$ of the belt-pulley $d$ and that the spring $g$ uncouples the friction coupling.

Upon the shaft $m$ there is rigidly keyed a pair of cams $q$, which cams when the lever $n$ is turned down engage brake blocks $s$, raise the same, and, through the combined action of the cams $q$ and the oblique guides $p$, cause said brake blocks to move sidewise from the position shown in Fig. 3 in full lines into the position shown in dotted lines, thereby braking the fly wheel, said blocks in the latter position binding against the rim of said wheel.

In the modified form of the invention shown in Fig. 5, the belt pulley $d$ is loosely mounted upon the circumference of the friction cone $c$ with which the fly wheel is provided, the tendency of the springs $g$ being to keep the coupling parts constantly in engagement, thereby avoiding the occurrence of sliding friction between the belt pulley and the fly wheel. A half ring $u$ connected by means of screw bolts $v$ that pass through the fly wheel, with the spring support $w$ located at the other side of the fly wheel is arranged with the annular groove $t$ in the hub of the belt pulley. The spring support $w$ can be moved lengthwise of the shaft $a$ and is forced toward the right by means of the spring $g$ which surrounds the bolt $v$ and bears against the fly wheel $b$ with the result that the friction cones $d$ and $c$ engage each other. The ring 3 with the tapered tappets $h$ against which the tapered ends $i$ of the connecting rod $k$ rest, slides on the movable spring support $w$. The uncoupling is effected, when the lever is turned down, by means of an eccentric connecting link $z$ which is arranged on the disengaging lever *n* and with which the roller *r* of the connecting rod *k* engages. The braking in this form of the invention is effected not by means of brake blocks but by a friction cone. For this purpose there are provided at each side of the fly-wheel *b* friction cones *c* and *c'*, of which when the coupling is effected the cone *c* enters into the belt pulley, while during uncoupling the cone *c* enters into the hollow cone *d'* which is connected with the ring 3. When the uncoupling lever *n* is turned down and the connecting rod *k* correspondingly raised, the friction cones *c* and *d* will consequently become disengaged while the brake cones *c'* and *d'* will be engaged. The springs *g* in this case also enable the friction cones to be adjusted, when their friction surfaces have become worn.

The application of the invention is not limited to printing machinery.

Having thus declared the nature of my said invention and in what manner it is to be performed I declare that what I claim is:—

1. The combination, with a drive shaft, and fast and loose clutch members mounted thereon, of a shifting ring loosely connected with the loose clutch member and provided with beveled projections; means for normally exerting upon said loose clutch member a tendency toward movement in one direction; an endwise movable rod having a beveled end arranged to engage said projections; and means for advancing said rod, to operate said ring, for moving said loose clutch member in the opposite direction.

2. The combination, with a drive shaft, and fast and loose clutch members mounted thereon, of a shifting member connected with the loose clutch member; means for normally exerting upon said loose clutch member a tendency toward movement in one direction; a rod provided with a roller and having one end thereof arranged to engage said shifting member; and an operating lever provided with a member engaged with said roller, for imparting an endwise movement in one direction to said rod.

3. The combination, with a drive shaft, of a fly wheel rigidly mounted thereon and having its hub constituting a friction cone; a pulley loosely mounted on said shaft and constituting a complemental hollow cone adapted to receive the first-named cone; a laterally-movable shifting member loosely carried by the second-named cone; an endwise movable rod having one end thereof arranged to engage the shifting member; means for normally holding said rod in projected position, with said end in such engagement, to couple the cones; means for retracting said rod, to disengage said end; and a spring interposed between said cones for automatically uncoupling the same when said rod is retracted.

In testimony whereof I have hereunto set my hand in presence of two subscribing witnesses.

MAX ROCKSTROH.

Witnesses:
ULYSSES J. BYWATER,
PAUL ARRAS.